United States Patent [19]
Tiley et al.

[11] Patent Number: 5,172,506
[45] Date of Patent: Dec. 22, 1992

[54] WIND DIRECTION RESPONSIVE AND HEIGHT ADJUSTABLE GOOSE DECOY

[76] Inventors: Garen R. Tiley; Alicia R. Tiley, both of 18744 Tadlock Cir., Alexander, Ark. 72002

[21] Appl. No.: 845,180

[22] Filed: Mar. 3, 1992

[51] Int. Cl.⁵ ............................................. A01M 31/06
[52] U.S. Cl. .......................................................... 43/3
[58] Field of Search .......................................... 43/3, 2

[56] References Cited

U.S. PATENT DOCUMENTS

| | | |
|---|---|---|
| 892,528 | 7/1908 | Kricke . |
| 1,066,587 | 7/1913 | Cunningham ............................. 43/3 |
| 1,473,612 | 11/1923 | Dewey . |
| 1,813,370 | 7/1931 | Villatori ..................................... 43/3 |
| 2,011,480 | 8/1935 | Gazalski ..................................... 43/3 |
| 2,711,608 | 6/1955 | Fulster ....................................... 43/3 |
| 2,787,074 | 4/1957 | Miller ......................................... 43/3 |
| 4,062,141 | 12/1977 | Shjeflo . |
| 4,435,913 | 3/1984 | Messina ..................................... 43/3 |
| 4,611,421 | 9/1986 | Jacob . |
| 4,651,457 | 3/1987 | Nelson et al. . |
| 4,753,028 | 6/1988 | Farmer ....................................... 43/3 |
| 4,893,428 | 1/1990 | Gagnon ..................................... 43/3 |
| 4,928,418 | 5/1990 | Stelly ......................................... 43/3 |

Primary Examiner—Kurt C. Rowan
Attorney, Agent, or Firm—Jacobson, Price, Holman & Stern

[57] ABSTRACT

A decoy is provided including a shape retentive head and neck structure supporting a cylindrical body at its lower end downwardly from which a first support shank extends. The support shank extends downwardly through upper and lower portions of the open front end of a horizontally elongated hollow and flexible water fowl simulating body portion closed at its rear end. A sleeve is disposed within the front end of the body portion about the cylindrical body and is upwardly displaced thereover for clamping an annular portion of the flexible body portion between the external surfaces of the cylindrical body and the internal surfaces of the sleeve. The lower end of the shank is rotatably supported and vertically adjustable relative to the upper end portion of a ground support shank including a lower end adapted to penetrate the ground.

14 Claims, 2 Drawing Sheets

U.S. Patent     Dec. 22, 1992     Sheet 1 of 2     5,172,506
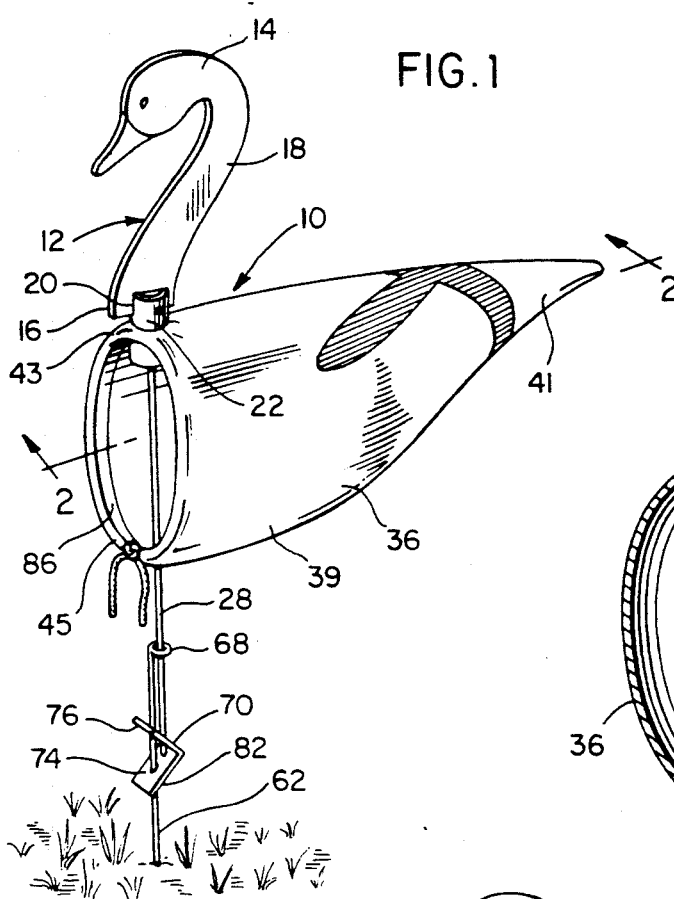
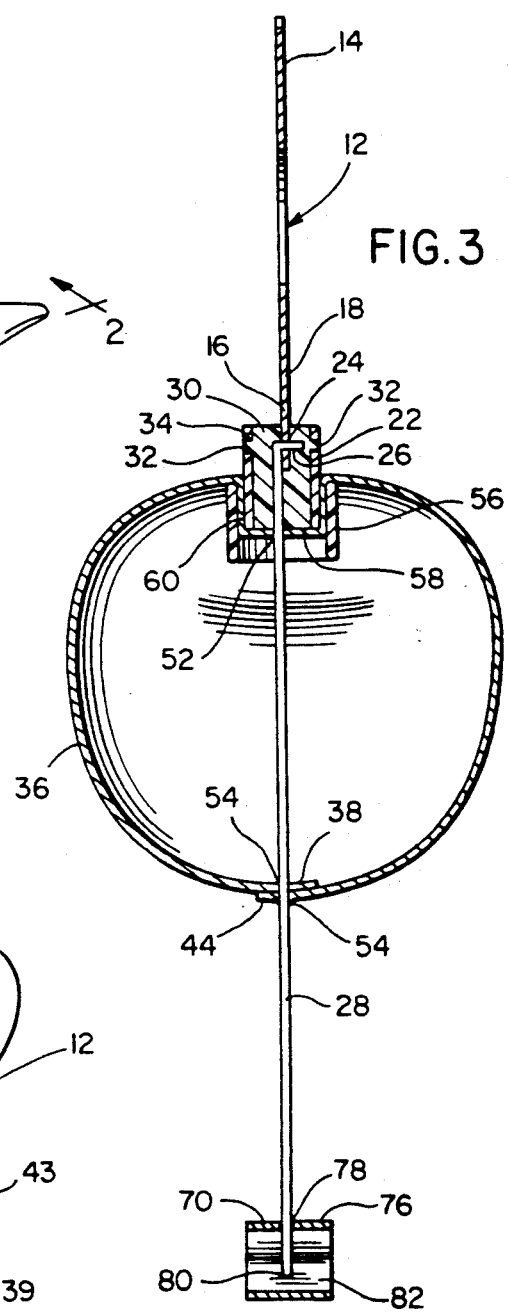
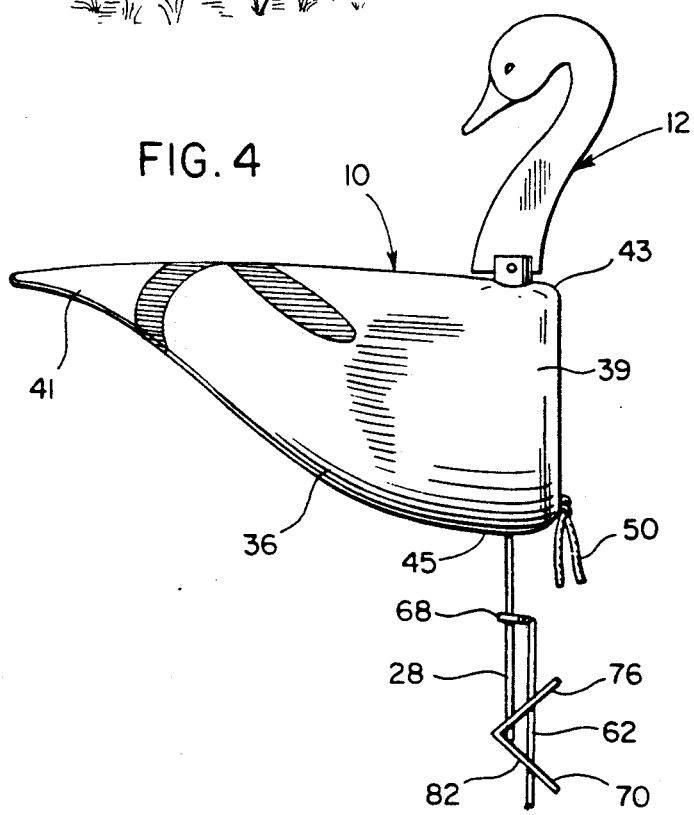
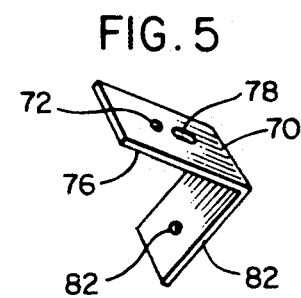

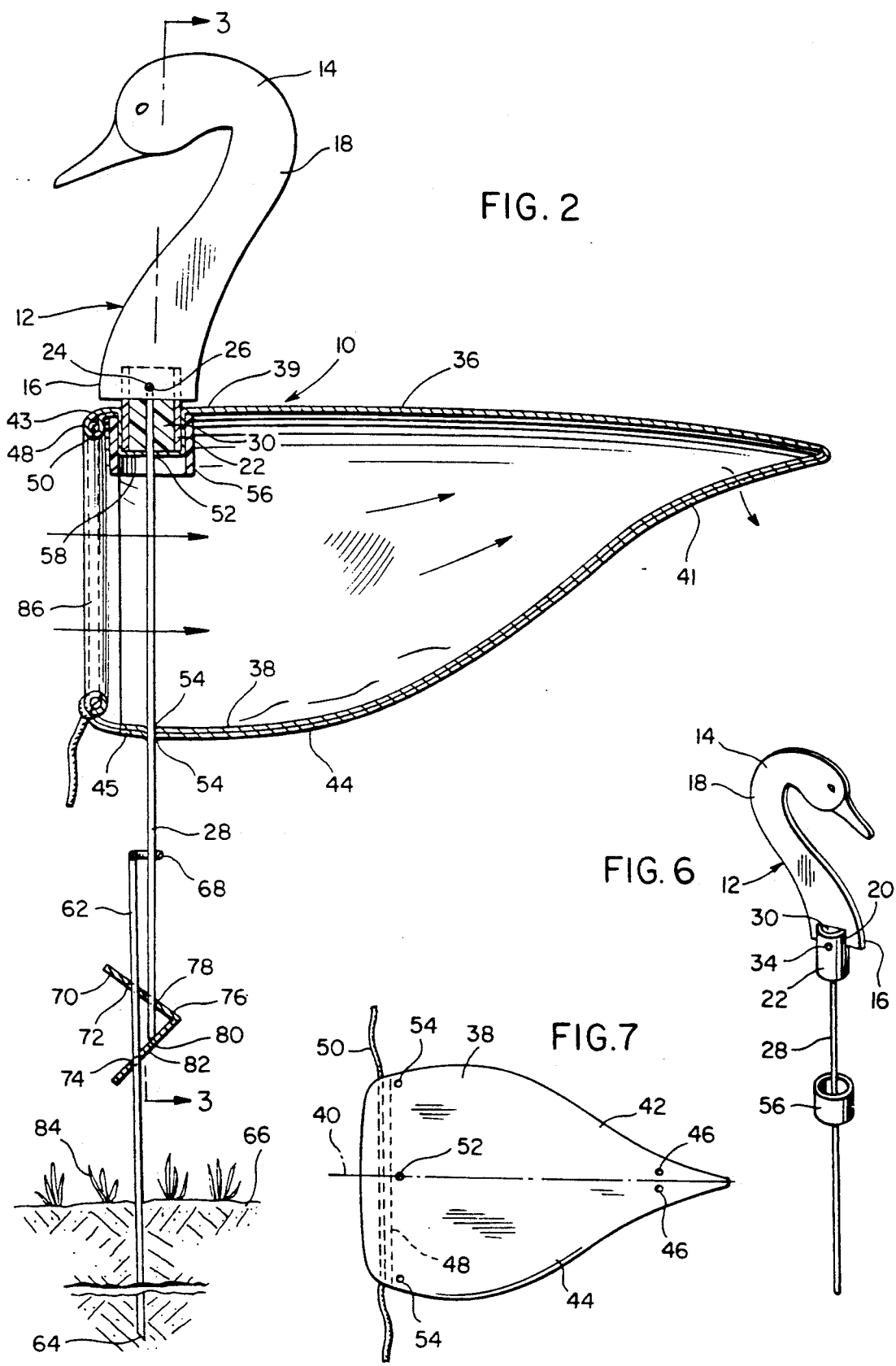

WIND DIRECTION RESPONSIVE AND HEIGHT ADJUSTABLE GOOSE DECOY

BACKGROUND OF THE INVENTION

1. Field of the Invention

This invention relates to a goose decoy having a hollow flexible, and thus foldable body and a stiff head and neck structure supported from the body in a manner such that the head and neck structure may be adjusted about a generally vertical axis relative to the body. Further, the decoy includes a support shank removably engagable with the combined head and neck assembly and a ground spike assembly from which the support shank is supported for elevational adjustment thereto and free angular displacement about the longitudinal axis of the support shank.

2. Description of Related Art

Various different forms of water fowl decoys heretofore have been provided including some of the general structural and operational features of the instant invention. Examples of these previously known forms of decoys are disclosed in U.S. Pat. Nos. 892,528, 1,473,612, 4,062,141, 4,611,421 and 4,651,457. However, these previously known decoys do not include the overall combination of structural features of the instant invention nor some of the specific structural features thereof.

SUMMARY OF THE INVENTION

The decoy of the instant invention has been designed to provide a decoy which may be compactly stored, which may have the head and neck portions thereof angularly adjusted relative to the body portion thereof, which may be adjusted in height relative to the ground so as to be elevated above ground stubble of various height and to provide a decoy of the wind sock type that will automatically swing into the wind as the wind direction changes. Still further, the decoy is constructed whereby its responsiveness to wind directional change may be varied.

The main object of this invention is to provide a water fowl decoy which may be compactly stored and quickly erected.

Another object of this invention is to provide a decoy including a combined head and neck assembly which may be adjustable angularly displaced about a vertical axis relative to a body portion of the decoy.

Still another object of this invention is to provide a decoy which will be supported for rotation about a vertical axis from the ground and which will automatically swing into the wind as the direction incident thereon changes.

A further object of this invention is to provide a decoy which may be supported from the ground in a manner enabling vertical adjustment of the decoy relative to the ground so as to provide minimum ground clearance to ground stubble of different height.

Another important object of this invention is to provide a water fowl decoy which will be capable of swinging into the wind as the wind direction incident thereon changes, but with the decoy being constructed so as to be adjustably variable in responsiveness to wind direction change.

A final object of this invention to be specifically enumerated herein is to provide a water fowl decoy in accordance with the preceding objects and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a decoy constructed in accordance with the present invention as operably mounted from an underlying ground surface;

FIG. 2 is an enlarged longitudinal vertical sectional view taken substantially upon the plane indicated by the section line 2—2 of FIG. 1;

FIG. 3 is a transverse vertical sectional view taken substantially upon the plane indicated by the section line 3—3 of FIG. 2;

FIG. 4 is a side elevational view of the decoy with the head and neck structure rotated 180 degrees relative to the position thereof illustrated in FIGS. 1 and 2;

FIG. 5 is an enlarged perspective view of the spring clip by which height adjustment of the decoy is accomplished and the decoy shank is supported for rotation about its longitudinal axis relative to the ground spike;

FIG. 6 is a perspective view of the head and neck structure with the decoy support shank depending downwardly therefrom and having a mounting sleeve loosely disposed thereon by which the flexible body of the decoy has its forward upper end portion supported from the lower extremity of the head and neck structure; and FIG. 7 is a plan view of the flexible body portion of the decoy.

DESCRIPTION OF THE PREFERRED EMBODIMENTS

Referring now more specifically to the drawings the numeral 10 generally designates a goose decoy constructed in accordance with the present invention. The goose decoy 10 includes a combined head and neck structure referred to in general by the reference numeral 12 including a head portion 14 and a neck portion 16.

The head and neck portions 14 and 16 are integrally formed from a single panel 18 of waterproof material such as plastic and the panel 18 is of a shape to simulate the head and neck of a goose.

The lower end of the panel 18 is anchored within a diametric slot 20 formed in the upper end of a cylindrical body 22 and provided with a transverse bore 24 through which a right angled, horizontally directed upper terminal end 26 of a thin rod-like support shank 28 is passed. The connection between the terminal end 26 and the lower end of the portion 18 is disposed within the cylindrical body 22 and encased within a body 30 of sealant material fully occupying the interior of the cylindrical body 22 and including integral portions 32 thereof received in diametrically opposite radial bores 34 formed in the cylindrical 22.

The decoy 10 also includes a hollow, flexible tubular body or body portion 36 formed from a blank 38 of suitable waterproof material such as DuPont "TYVEK". The blank 38 includes front and rear ends 39 and 41 and the front end 39 includes upper and lower portions 43 and 45. The blank 38 is curved outwardly and downwardly along its longitudinal center line 40 with its opposite side margins 42 and 44 lapped and secured to each other in any convenient manner, the rear end of the blank 38 including a pair of air outlet openings 46 formed therein and the forward end of the blank 38 including a hem 48 having a draw string 50 secured therethrough. In addition, the center line of the blank 38 is provided with a forward aperture as at 52 and opposite side marginal apertures 54. The marginal apertures 54 are registered with each other when the blank 38 is folded and has its margins 42 and 44 lapped and secured together and the registered apertures 54 are disposed in vertical registry with the center line aperture 52, the lower end portion of the support shank 28 passing downwardly through the aperture 52 as well as the apertures 54.

When the decoy 10 is assembled, the shank 28 is passed downwardly through the apertures 52 and 54 with a sleeve 56 disposed on the shank 28 between the aperture 52 and the apertures 54 within the open forward end of the body 36. The cylindrical body 22 and sealant body 30 rests immediately upon the upper surface of a circular area 58 of the blank 38 having the aperture 52 at its approximate center and an outer annular zone 60 of the blank 38 disposed immediately outward of the circular area 58 is displaced upwardly about the exterior of the cylindrical body 22, afterwhich the sleeve 56, having a slightly larger inside diameter than the outside diameter of the cylindrical body 22, is displaced upwardly over the lower end of the cylindrical body 22 for clampingly engaging the annular zone 60 of the blank 38 between the inner surfaces of the sleeve 56 and the outer surface of the cylindrical body 22. In this manner, the shape retaining body 36 of the decoy 10 is supported from the cylindrical body 22 carried by the lower end of the neck portion 16.

If it is desired, the sleeve 56 may be displaced downwardly from the position thereof illustrated in FIG. 3, the body 36 may be rotated 180 degrees about the support shank 28 and the cylindrical body 22 and the sleeve 56 may then be displaced upwardly into a position such as that illustrated in FIG. 3. In this manner, the body may be angularly displaced relative to the head and neck structure 12 so as to reverse the position of the latter to the position thereof illustrated in FIG. 4 from the position thereof illustrated in FIG. 1.

In addition, the decoy 10 includes a ground shank 62 including a beveled lower end 64 for downward penetration into the ground 66 and an upper end integral horizontal eye 68 downwardly through which the support shank 28 is loosely slidably and rotatably received.

Also, an angulated spring clip 70 apertured as at 72 and 74 is provided and is frictionally retained in adjusted position along the ground shank 62 below the eye 68 and the upper apertured leg 76 of the spring clip 70 has an additional aperture 78 formed therein which is somewhat elongated longitudinally of the leg 76 and which slidably and rotatably receives therethrough the lower end of the shank 28. The lower terminal end 80 of the shank 28 is rounded and abuts against the included angle side of the lower leg 82 of the spring clip 70. Thus, once the ground shank 62 has been downwardly inserted into the ground 66, the support shank 28 may have its lower end passed downwardly through the eye 68 and the elongated aperture 78, whereby the support shank 28 is rotatably supported from the ground shank 62. Of course, the adjusted height of the spring clip 70 along the ground shank 62 determines the height of the body 36 above the ground 66 and the stubble 84 thereon. For purposes of clarity of illustration, the height of the ground stubble 84 has been greatly diminished and it is to be noted that usually the ground stubble will extend upwardly to a point which closely underlies the body 36 of the decoy 10. In addition, if desired, the lower end portion of the support shank 28 disposed between the legs 76 and 82 of the spring clip 70 may be provided with a removable abutment (not shown) preventing upward withdrawal of the lower terminal end 80 of the support shank 28 through the aperture 78, thus locking the shanks 28 and 62 together. In addition, the draw string 50 is utilized to vary the size of the forward open 86 of the body 36 to thereby vary the amount of incident wind which may enter the forward end of the body 36. The apertures 46 allow for the air entering the forward open end 86 of the body 36 to be exhausted therefrom.

Inasmuch as the support shank 28 is disposed at the forward end of body 36 and the latter acts like a wind sock, the decoy 10 will swing into the prevailing wind. However, if the wind is gusty and frequently changes direction, the open end 86 of the body 36 may be appreciably closed by tightening the draw string 50. This will allow less air to enter the forward end of the body 36 and to thereby reduce the responsiveness of the body 36 to swing into the prevailing wind.

It is again stressed that the body 36 is flexible. Therefore, many decoys 10 may be carried to and from a hunting area by a single person. Furthermore, because of the simple structure of the decoy 10, the decoys may be readily deployed and thereafter picked up after a hunting session. Further, adjustment of the combined head an neck structure 12 relative to the body 36 may be readily accomplished, as desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A decoy including a first upright support shank having upper and lower end portions, said lower end portion being adapted for support from a generally horizontal support surface, a water fowl combined neck and head structure including a neck lower end supported from said upper end portion, a flexible, hollow water fowl simulating body portion including front and rear ends, said front end including upper and lower portions, said first, shank upper end portion extending downwardly through at least said body upper portion, said neck lower end including a body supported therefrom having a generally cylindrical outer surface, a sleeve disposed within said body portion and having a generally cylindrical bore formed therethrough of slightly greater diameter than the diameter of said outer surface, said first shank passing downwardly through an aperture formed in an area of said body upper portion disposed closely beneath said body with a generally annular zone of said body upper portion disposed about said area extending upwardly from said area and being removably wedged between said outer surface and the surfaces of said bore, with said body in selected adjusted rotated position relative to said area and zone, for support of said zone, and thus said body upper portion, from said body.

2. The decoy of claim 1 wherein said front end of said body portion is open for receiving incident wind therein and the rear end of said body portion includes a small vent opening therein.

3. The decoy of claim 2 wherein said front end includes means, exclusive of said first shank, operative to selectively vary the cross sectional size of said open front end.

4. The combination of claim 2 wherein said first shank also extends downwardly through an aperture provided therefore in said lower portion.

5. The decoy of claim 4 wherein said neck and head structure is constructed of plastic.

6. The decoy of claim 4 wherein said body portion is constructed of sheet material constructed of DuPont "TYVEK".

7. The decoy of claim 6 wherein said body portion is formed from a sheet of said material including overlapped and joined margins extending lengthwise along the lower portion of said body portion, said aperture in said body lower portion being formed through said overlapped margins of said sheet.

8. A decoy including a first upright shank having upper and lower end portions, a water fowl combined neck and head structure including a neck lower end supported from said upper end portion, a water fowl simulating body portion supported from a lower portion of said neck and head structure above said shank lower end portion and of a shape to simulate the body of a water fowl, a second ground shank having upper and lower ends, said second shank lower end being adapted to be projected downwardly into the ground for stationary support therefrom, the upper end of said second shank including upstanding sleeve means supported therefrom downwardly through which the lower end portion of said first shank is slidably and rotatably received, and abutment means stationarily mounted on said second shank for adjustable shifting therealong above said lower end and below said sleeve means, the lower end portion of said first shank and said abutment means including means rotatably journaling and preventing downward movement of said first shank lower end portion relative thereto.

9. The decoy of claim 8 wherein said abutment means includes a spring clip height adjustably mounted on said second shank.

10. The decoy of claim 8 wherein said body portion comprises a flexible, hollow body portion including front and rear ends, said front end including upper and lower portions, said first shank upper end portion extending downwardly through at least said body upper portion, said neck lower end including a body supported therefrom having a generally cylindrical outer surface, a sleeve disposed within said body portion having a generally cylindrical bore formed therethrough of slightly greater diameter than the outer surface of said body portion, said first shank passing downwardly through an aperture formed in an area of said upper portion disposed closely below said body portion with a generally annular zone of said body upper portion disposed about said area extending upwardly from said area and being removably wedged between said outer surface and the surfaces of said bore, with said body in selected adjusted rotated position relative to said area and zone, for support of said zone, and thus said body upper portion, from said body.

11. The decoy of claim 10 wherein said front end of said body portion is open for receiving incident wind therein and the rear end of said body portion includes a small vent opening therein.

12. The decoy of claim 11 wherein said front end includes means, exclusive of said first shank, operative to selectively varying the cross sectional size of said open front end.

13. The decoy of claim 11 wherein said first shank also extends downwardly through an aperture provided therefore in said lower portion.

14. The decoy of claim 13 wherein said body portion is formed from a sheet of said material including overlapped and joined margins extending lengthwise along the lower portion of said body portion, said aperture in said body lower portion being formed through said overlapped margins of said sheet.

* * * * *